United States Patent

Desjardins et al.

[11] 4,311,213

[45] Jan. 19, 1982

[54] VIBRATION ISOLATION SYSTEM

[75] Inventors: Rene A. Desjardins, Media; Vladimir Sankewitsch, West Chester, both of Pa.

[73] Assignee: The Boeing Company, Seattle, Wash.

[21] Appl. No.: 72,748

[22] Filed: Sep. 5, 1979

[51] Int. Cl.³ .............................................. F16F 7/10
[52] U.S. Cl. .................................. 188/380; 244/17.27
[58] Field of Search ...................... 188/1 B; 244/17.27; 74/574

[56] References Cited

U.S. PATENT DOCUMENTS 3,536,165 10/1970 Desjardins ........................ 188/1 B
4,088,042 5/1978 Desjardins et al. ............. 188/1 B X Primary Examiner—Duane A. Reger
Attorney, Agent, or Firm—Felix J. D'Ambrosio; Edwin E. Greigg; Jack D. Puffer

[57] ABSTRACT

A vibration isolation system for a passenger carrying helicopter with which the crew seats in the cockpit area and the floor in the passenger area are decoupled from the airframe thereby isolating the seats and floor from the airframe vibrations. In addition, the fuel tanks of the helicopter are isolated from the airframe so that a force feedback from the fuel tank to the airframe resulting from the changing fuel quantity is effectively eliminated. The system employs nodal isolators which both isolate (decouple) and support the particular structural mass in question.

10 Claims, 17 Drawing Figures

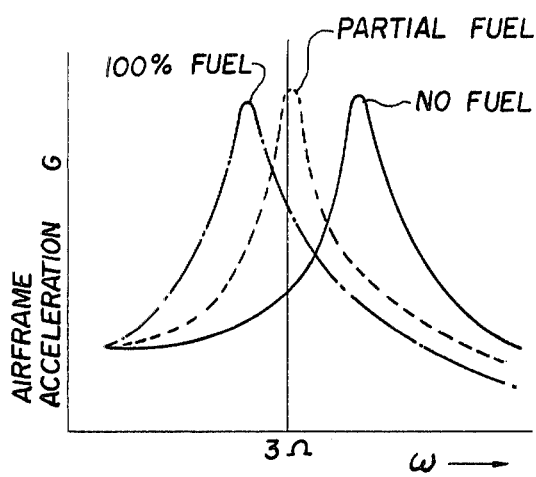
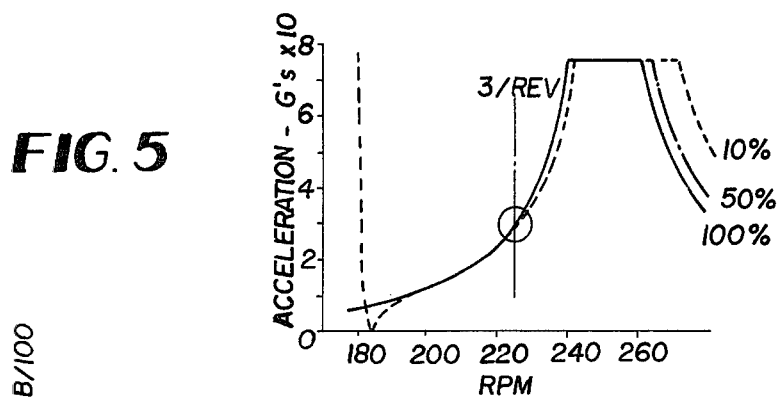
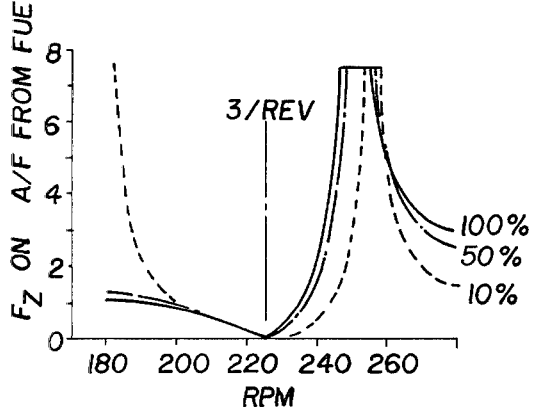

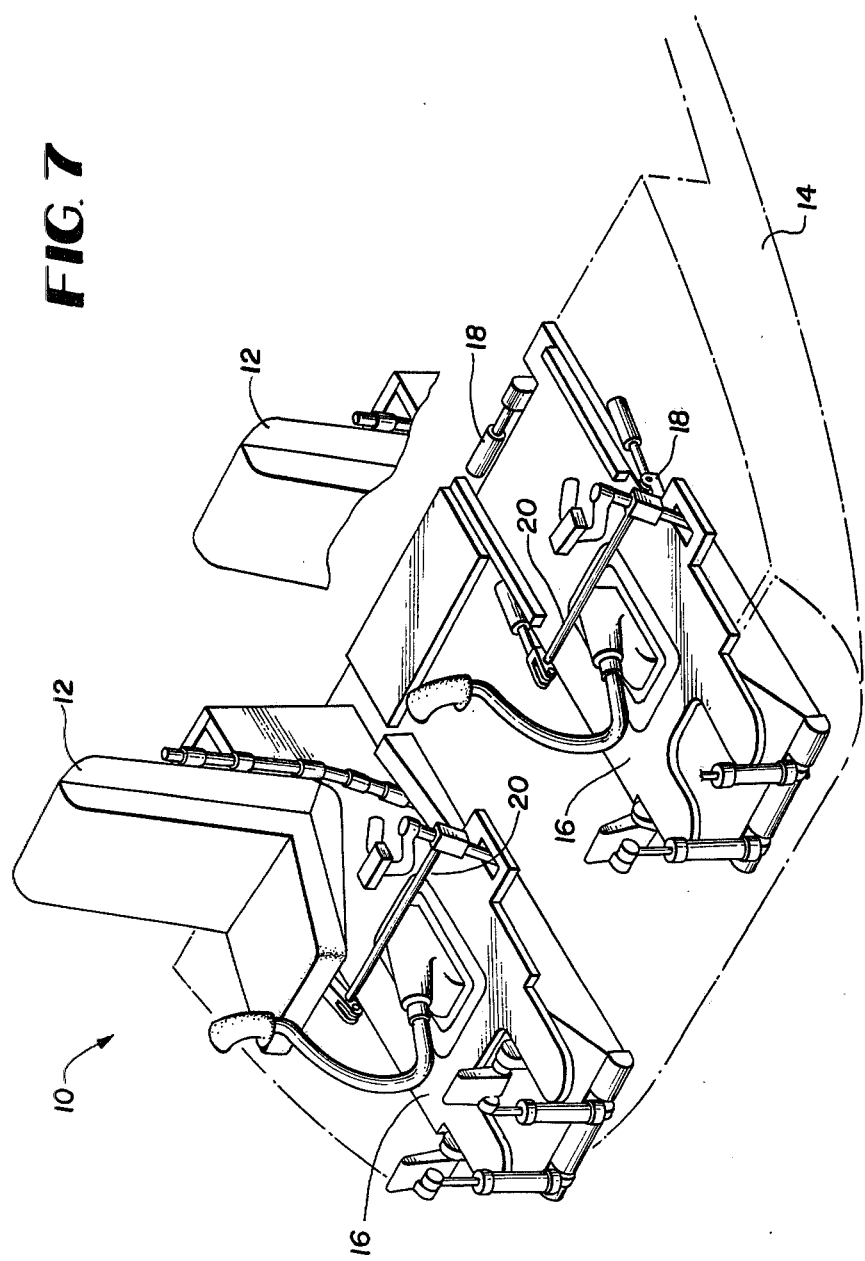

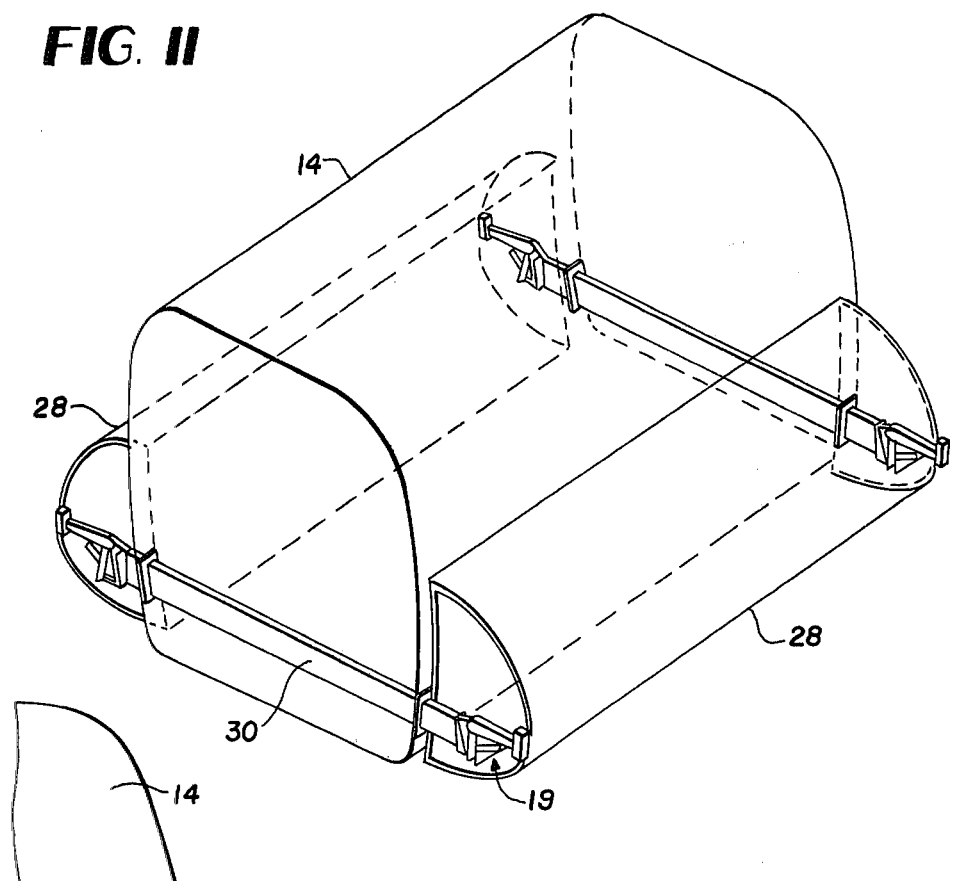
FIG. 11
FIG. 16
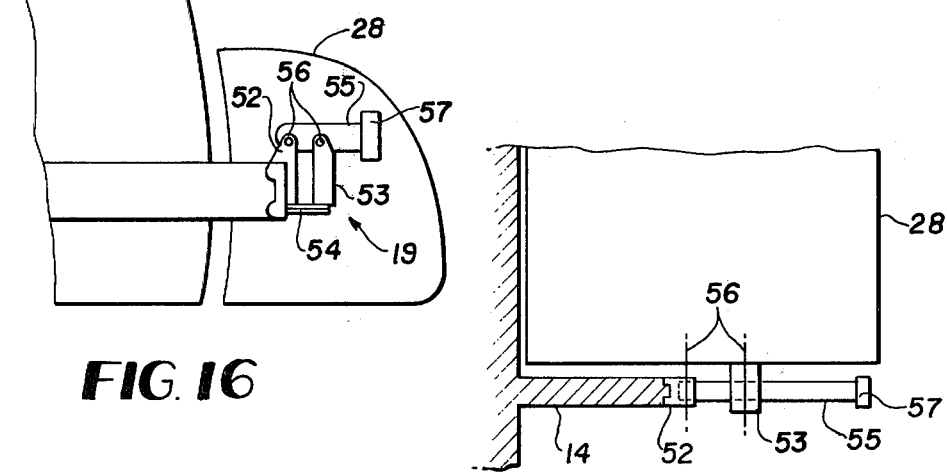
FIG. 17

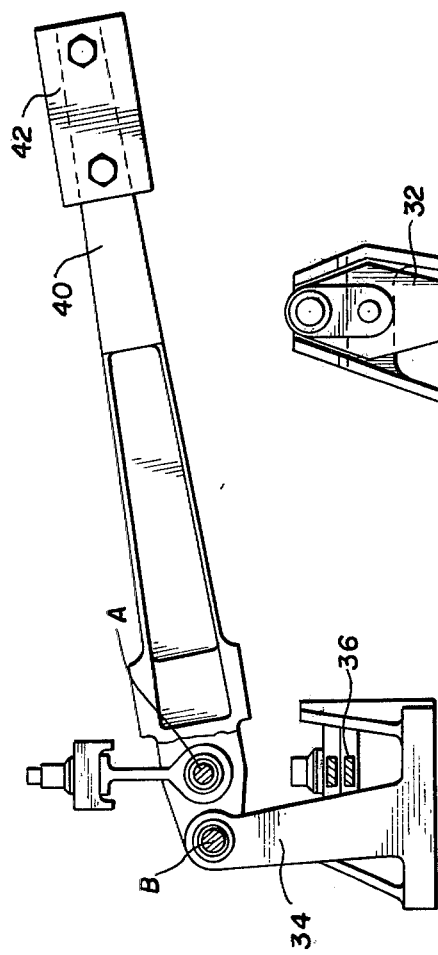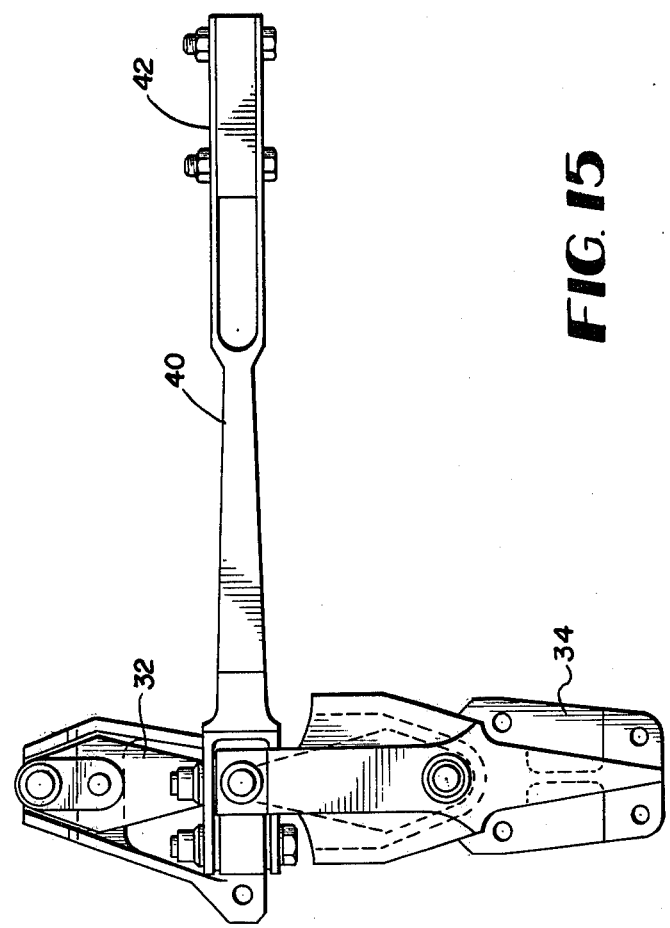

VIBRATION ISOLATION SYSTEM

BACKGROUND OF THE INVENTION

The invention relates to the vibration isolation systems which employ nodal isolators. The nodal isolators develop opposing spring and inertia forces which produce a substantially zero vibratory motion of the isolated mass at predetermined frequencies of vibration or produce zero force feedback of an isolated mass to a non-isolated mass. In particular, the invention is utilized for isolating certain structural masses of helicopters or eliminating force feedback of certain structural masses of helicopters to the primary structure.

The vibrations which develop during the operation of a helicopter are not conducive to personnel comfort. In helicopters for military use, the problem is of less concern than in helicopters for commercial use, especially when the commercial use entails relatively long flight times. For example, it is the prime mission of Boeing's Model 234 helicopter to ferry personnel to and from off-shore drilling platforms. To accomplish this mission, airline passenger seats have been installed in the Model 234 helicopter. While this type of seat is helpful, it is not the entire answer since the seats must be anchored to the floor of the helicopter which, in turn, is anchored to the airframe which is subjected to the vibratory forces.

Because of the relatively long flight time, the Model 234 helicopter has been equipped with large fuel tanks. The fuel in these tanks represents a varying dynamic mass (changing fuel levels) which have a deleterious effect on airframe natural frequency placement.

OBJECTS AND SUMMARY OF THE INVENTION

One object of the invention, therefore, is to reduce as much as possible the vibrations which tend to directly affect passengers and crew members of the helicopter.

Another object of the invention is to reduce as much as possible the deleterious effect on airframe natural frequency placement due to the varying fuel levels in the helicopter fuel tanks.

An object related to the second stated object is to improve the mounting of the fuel tanks to the airframe such that force feedback to the airframe from the fuel tanks due to the variance in fuel levels is eliminated.

For the specific model 234 helicopter, we have set out to provide a vertical vibrational force of no more than 0.05 g on the floor of the helicopter at the predominant 3/rev excitation frequency, within ±5 rpm of rotor speed, at all operational fuel loads.

To accomplish these objects, we have developed a system which isolates the floor, crew seats and fuel tanks from the helicopter airframe. The system employs nodal isolators arranged to support the floor, crew seats and fuel tanks and to isolate these structures from the airframe. The floor and crew seat nodal isolators neutralize the forced vibrations and motions imposed on the airframe by the vibratory environment of the helicopter in flight, while serving to support the isolated structures as intended. The fuel tank isolators neutralize the tank effective mass at the airframe attachment point. For a discussion of the theory of a nodal isolator, see U.S. Pat. No. 4,088,042, issued on May 9, 1978, to Rene A. Desjardins, Charles W. Ellis and Vladimir Sankewitsch.

The nodal isolators are located with respect to the structure to be isolated (floor, crew seats or fuel tanks) so that they will support the static weight of these structures, and are then tuned, thereby affecting a network of isolators which attenuate the forced vibration at each location such that the entire structure is effectively isolated.

While the specific objects of the invention are achieved with respect to the floor, crew seats and fuel tanks of the helicopter, the system proposed could readily be adapted for other structural masses which are intended to be used in a vibration environment. For example, electronic assemblies could be isolated from a vibration environment in accordance with the invention.

The invention will be better understood and further objects and advantages thereof will become more apparent from the ensuing detailed description of the preferred embodiments taken in conjunction with the drawings.

BRIEF DESCRIPTION OF THE DRAWINGS

FIG. 4 is a diagram illustrating the effect of the fuel level in the non-isolated fuel tanks on the airframe natural frequency;

FIG. 5 is a diagram illustrating the effect of the fuel level in the isolated fuel tank on the airframe natural frequency;

FIG. 6 is a diagram illustrating the force feedback of an isolated fuel tank;

FIG. 7 is a schematic isometric illustration of a helicopter cockpit in which the crew seats have been vibrationally isolated in accordance with the invention;

FIG. 11 is a schematic isometric view of the helicopter fuel tanks vibrationally isolated according to the invention;

FIGS. 13, 14 and 15 are left elevation, right elevation and top views of a nodal isolator used in isolating the passenger floor of the helicopter;

FIG. 16 is a front view of a nodal isolator installation used to prevent force feedback of an isolated fuel tank to the airframe; and FIG. 17 is a plan view of FIG. 16.

DETAILED DESCRIPTION

General Discussion

Figure 1:
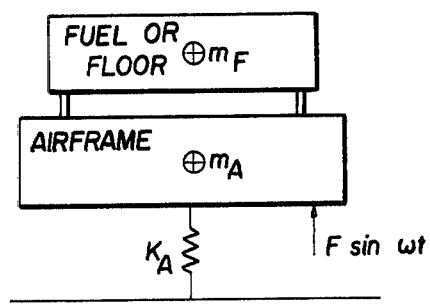
FIG. 1 is a schematic diagram illustrating the vibration model for a helicopter in which the fuel tanks or the floor are rigidly attached to the airframe which is subjected to a forced vibration.

The model illustrated in FIG. 1 is typical of a situation in which the floor or fuel tanks are not isolated from the airframe. The airframe mass is designated $m_A$, while the floor or fuel tank mass is designated $m_F$. The two masses are subjected to a periodic forcing function $F \sin \omega t$. This forcing function derives from the helicopter rotor system and subjects both the airframe and the attached structure, such as the floor and fuel tanks, to a repetitive displacement in the direction of the force. The spring $K_A$ illustrated in the model of FIG. 1 refers to the inherent elasticity of the airframe. The airframe and the attached structural masses do experience a positive oscillating displacement in accordance with the forcing function.

Figure 2:
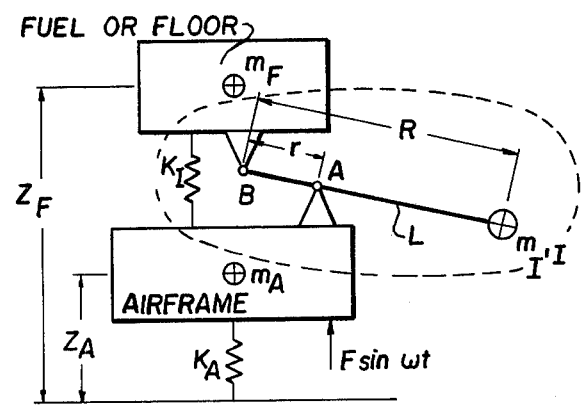
FIG. 2 is a schematic diagram illustrating a vibration model of a helicopter in which the floor or fuel tanks are vibrationally isolated from the airframe by a single frequency nodal isolator.

The model illustrated in FIG. 2 is typical of a situation in which a nodal isolator is employed to isolate the two masses. In the case of floor isolation, vibratory forces and motions are zero at pivot B. In the case of fuel tank isolation, the vibratory forces from the tank are zero at pivot A. The working parts of the nodal isolator are shown schematically within the dotted line. A spring $K_I$ joins the floor or fuel tank to the airframe, and a stiff bar L with mass $m_I$ and inertia I is pivotably mounted to both the floor or fuel tank and the airframe. The bar L is connected to the floor or fuel tank with a bearing at pivot B, and to the airframe with another bearing at pivot A, a distance r away from pivot B. The center of gravity of the bar L is a distance R away from pivot B.

The equation of motion for the isolated mass at a nodal isolator location is analytically derived and is as follows:

$$Z_F = Z_A \frac{\left\{ K_I - \omega^2 \left[ m_I \left( \frac{R}{r} - 1 \right) \frac{R}{r} + \frac{I}{r^2} \right] \right\}}{\left\{ K_I - \omega^2 \left[ m_F + m_I \left( \frac{R}{r} - 1 \right)^2 + \frac{I}{r^2} \right] \right\}} \quad (1)$$

where the remaining unidentified terms are:
 $Z_A$ = vibrating mass (airframe) displacement
 $Z_F$ = isolated mass (floor or fuel tank) displacement
 $K_I$ = spring constant of the nodal isolator
 $\omega$ = frequency of the forcing function Note that the terms in both { }, with the exception of the frequency term $\omega$ and $m_F$, are limited to the physical parameters of the nodal isolator. If the parameters in the numerator { } are chosen to yield a zero result, then $Z_F$ will equal zero and the isolated mass is hence effectively decoupled from the vibrating mass at the location of the nodal isolator. For this to occur, the following relationship for $K_I$ must exist:

$$K_I = \omega^2 \left[ m_I \left( \frac{R}{r} - 1 \right) \frac{R}{r} + \frac{I}{r^2} \right] \quad (2)$$

From which it is clear that if the physical parameters ($m_I$, R and r) are fixed, as they can be for a given nodal isolator configuration, then only one frequency will satisfy equation (2). This frequency is referred to as the antiresonant frequency, $\omega_A$. With $\omega = \omega_A$ and the physical parameters fixed, that is with the isolator tuned, $K_I$ will be such that $Z_F$ in equation (1) is zero, that is, the mass to be isolated will be decoupled from the vibrating mass.

Figure 3:
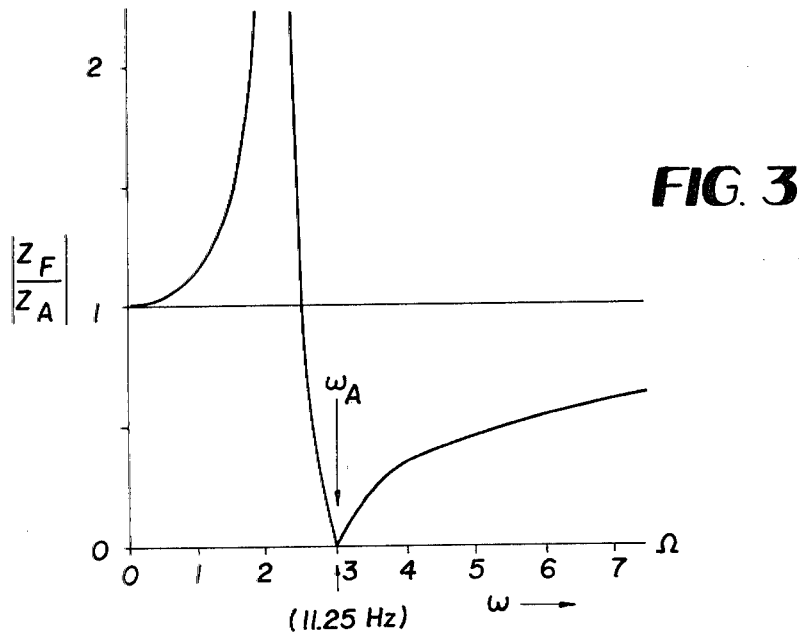
FIG. 3 is a graph showing a plot of transmissibility as a function of vibration frequency for the model of FIG. 2.

This result is illustrated in FIG. 3. The ordinate of FIG. 3 identifies the ratio of $Z_F/Z_A$, referred to as the transmissibility factor, and the abscissa identifies the loading frequency on the helicopter designated as 1/rev, 2/rev, 3/rev, etc. or $1\Omega$, $2\Omega$, $3\Omega$, etc. Note the trend: $Z_F/Z_A = 1$ at zero frequency; and climbs steeply to resonance as the frequency increases, and decreases to zero at the antiresonant frequency $\omega_A$. It is precisely at this point that the uncoupling is to become effective, and this result is achieved by the proper selection and tuning of the physical parameters of the nodal isolators.

For the model 234 helicopter, the antiresonant frequency $\omega_A$ is equal to 3/rev (11.25 HZ). The values of $K_I$, $m_I$, I, R and r of the individual nodal isolators are therefore chosen so that at every location decoupling of the isolated mass is achieved from the vibrating mass at 3/rev.

For isolating the floor of the helicopter from the vibrating airframe mass, therefore, equations (1) and (2) are sufficient and are applied at each location at which a nodal isolator is placed. Referring again to FIG. 2, pivot B of the floor at each isolator location is rendered stationary by the tuned isolator.

In addition to uncoupling the isolated mass from the vibrating mass, the nodal isolators must also be positioned and structurally adapted to statically support the isolated mass. Static support can be achieved by utilizing well known beam theory, such as the theory of the simply supported beam (two point support), etc.

For isolating the fuel tanks, however, the effect of a varying fuel quantity, and therefore a varying $m_F$, must be taken into consideration. FIG. 4 illustrates the effect on airframe natural frequency by the varying quantity of fuel in the fuel tanks. Note that at 100% fuel, the frequency of the airframe mode is below the frequency of 3/rev noted above, that with no fuel the frequency of the airframe is above 3/rev, and that somewhere in between, the frequency of the airframe mode would coincide with 3/rev and seriously degrade the airframe vibration environment. It becomes necessary, therefore, to decouple pivot A (FIG. 2) from the force feedback to the airframe from the varying fuel mass.

The equation of motion for preventing the force feedback to the airframe from the varying fuel mass utilizing a nodal isolator is analytically derived and is as follows:

$$-\left\{ K_I - \omega^2 \left[ m_I \left( \frac{R}{r} - 1 \right) \frac{R}{r} + \frac{I}{r^2} \right] \right\} Z_F \quad (3)$$
$$+ \left\{ K_I + K_A - \omega^2 \left[ m_A + m_I \left( \frac{R}{r} \right)^2 + \frac{I}{r^2} \right] \right\} Z_A = F \sin \omega t$$

where:
 $F \sin \omega t$ = the forcing function applied to the airframe

In this equation, the underlined terms are related to the airframe only. If the remaining terms in that relation could be induced to become zero, the airframe would become an uncoupled system and behave as though the fuel were not there at all. Accordingly, we can express equation (3) as follows:

$$\left. \begin{array}{l} -\left\{ K_I - \omega^2 \left[ m_I \left( \frac{R}{r} - 1 \right) \frac{R}{r} + \frac{I}{r^2} \right] \right\} Z_F \\ + \left\{ K_I - \omega^2 \left[ m_I \left( \frac{R}{r} \right)^2 + \frac{I}{r^2} \right] \right\} Z_A \\ + \left\{ K_A - \omega^2 m_A \right\} Z_A = F \sin \omega t \end{array} \right. \quad (4)$$

setting the terms within the dotted lines equal to zero yields $$\omega = \sqrt{\frac{K_I}{m_I \frac{\left(\frac{R}{r}\right)^2}{1 + \frac{m_I}{m_F}} + \frac{I}{r^2}}} \quad (5)$$

If we select the nodal isolator physical parameters such that equation (5) is satisfied, then the airframe becomes decoupled from the fuel at the forcing frequency $\omega = \omega_F$. Since the troublesome frequency for the fuel is the same as that for the floor, namely 3/rev, we will choose $\omega_F = 3/\text{rev}$. Note that equation (5) contains $m_F$, the fuel mass, so that fuel tuning will change with fuel load. Practically, this shift is very small, for the largest ratio of $m_I/m_F$ turns out to be 0.1, so that the tuning frequency shift will certainly be less than 5% ($1/\sqrt{1+0.1} = 1/1.05$). Analytical results show (FIG. 5) that the airframe acceleration level will indeed remain independent of fuel at the tuned 3/rev frequency (225 rotor RPM). This is due to the fact that at this frequency there is no force feedback from the fuel to the airframe as shown in FIG. 6, which also indicates that the slight detuning effect at low fuel is of no great importance since the transmitted force levels remain so low that their effect could not be seen in the airframe response (FIG. 5), which remained virtually unchanged for fuel levels ranging from 10% to 100%.

Preferred Embodiments

As noted above, three areas of the Model 234 helicopter were studied for vibration isolation: the cockpit area where the crew is located, the body of the aircraft where passengers will be located and the fuel tanks. The crew area and passenger area were studied for the purpose of producing a more comfortable environment which is substantially vibration free, while the fuel tanks were studied for their adverse effect on airframe natural frequency due to a changing fuel quantity.

Figure 8:
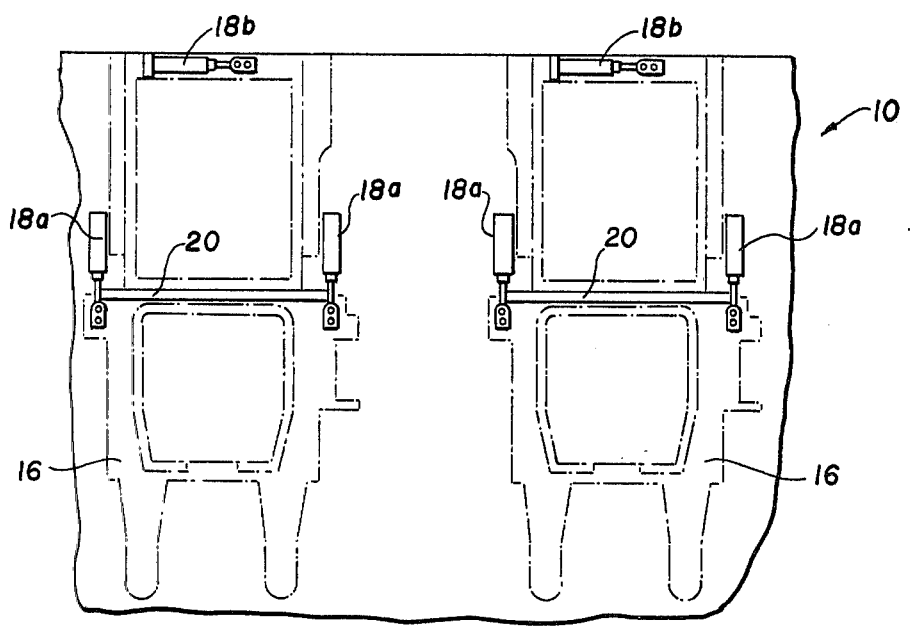
FIG. 8 is a schematic top plan view of the cockpit illustrated in FIG. 7.

The cockpit area 10 is shown in FIGS. 7 and 8. The crew seats 12 are typically mounted directly to the airframe 14. However, according to the present invention, the crew seats 12 are mounted first to a pallet 16, and the pallet 16 is in turn, mounted through nodal isolators 18 to the airframe 14. The arrangement of the nodal isolators 18 is shown more clearly in FIG. 8. The lateral nodal isolators 18a and the transverse nodal isolator 18b for each seat are arranged as shown to produce a three-point support assembly for the seat as well as uncoupling. An additional torsion rod 20 can be provided between the transverse nodal isolators 18a for each seat. The seats 12 are then mounted directly to the pallets 16. The isolators 18 are tuned in accordance with the equations noted above.

Figure 9:
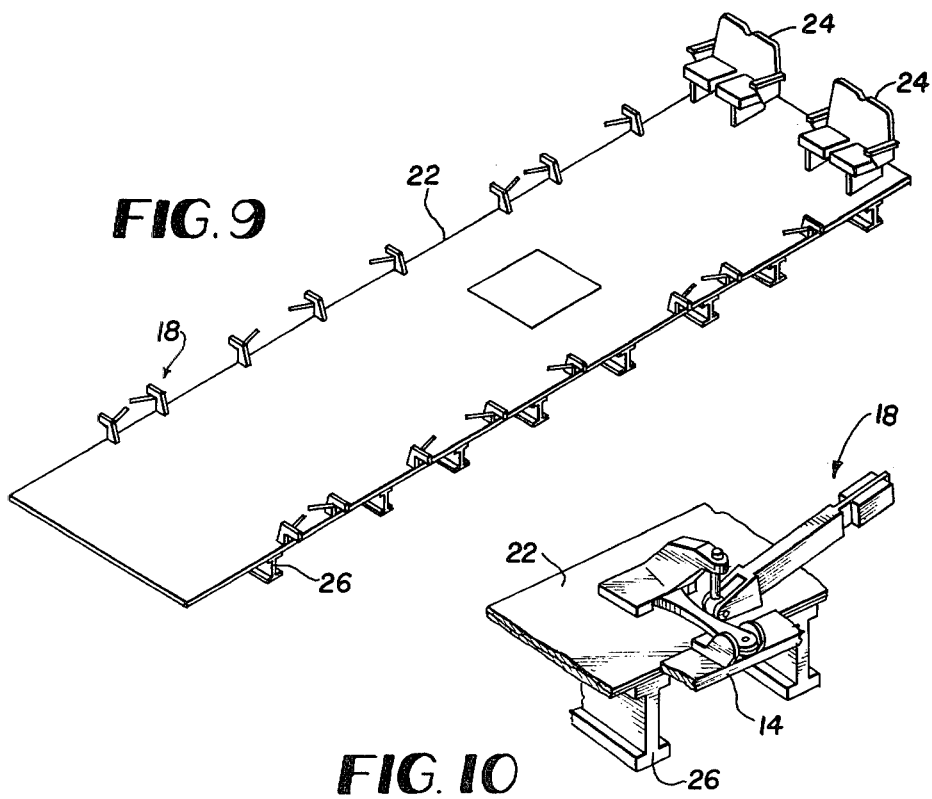
FIG. 9 is a schematic isometric view of a helicopter floor which has been vibrationally isolated with a network of nodal isolators in accordance with the invention.
Figure 10:
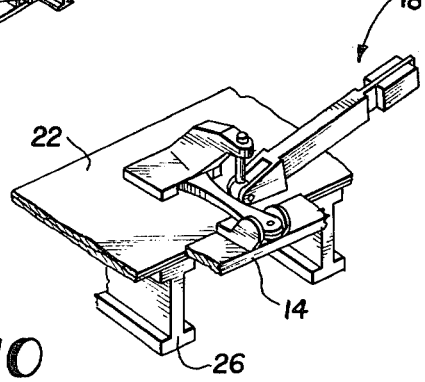
FIG. 10 is a schematic isometric view in more detail of one of the nodal isolators according to FIG. 9.

In FIG. 9, the helicopter floor 22 is shown on which passenger seats 24 are mounted. The floor 22 is provided with spaced beams 26 which provide stiffness support to the floor. Typically, the floor 22 is connected directly to the airframe 14. According to the invention, however, the floor 22 is isolated from the airframe 14 by a network of nodal isolators 18 arranged as shown in FIGS. 9 and 10. A portion of the isolator is anchored to the floor 22, another portion is anchored to the airframe 14 and the spring and tuning weight components are supported between the two anchors. As in the cockpit area, the floor 22 in the passenger area is provided with a sufficient number of isolators to provide a stable condition from a static and dynamic viewpoint.

In FIG. 11, the two fuel tanks 28 are shown mounted for isolation to the airframe 14 at their two ends by an isolation mounting assembly including a pair of nodal isolators 19 joined by a connecting bar 30.

Figure 12:
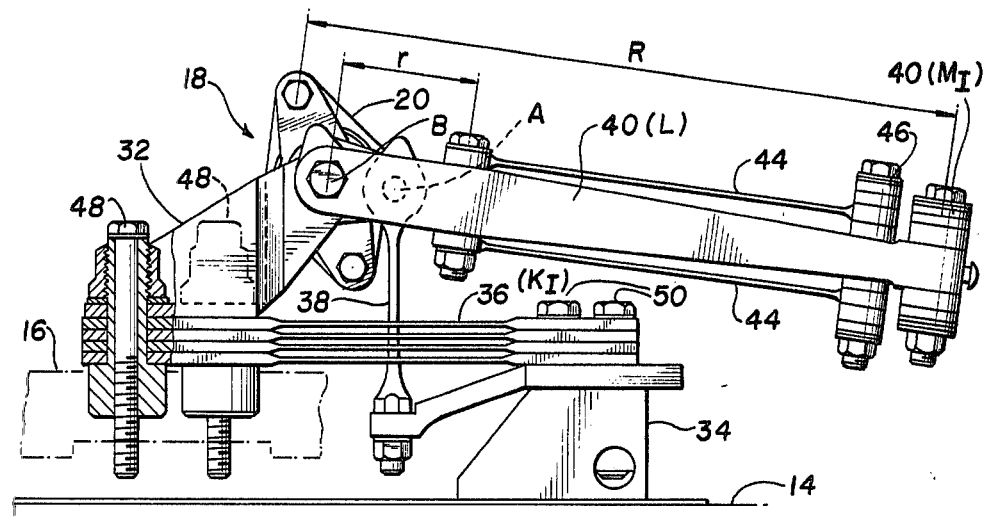
FIG. 12 is a side elevational view of a nodal isolator used to isolate the crew seats in the helicopter cockpit.

FIG. 12 illustrates a side elevation view of a nodal isolator which in particular is utilized in the cockpit area, but which can also be used in the passenger area to isolate the floor from the airframe.

The essential parts of the nodal isolator 18 shown are: the anchor pads 32 and 34, which fasten the isolator to the pallet 16 and airframe 14, respectively; the spring 36; the flex link 38; the arm 40 and its weights 42; and the springs 44 and its weights 46. The anchor pads 32 and 34 have extensions between which the flex link 38 is mounted. The anchor pads are preferably fastened to the pallet 16 and airframe 14 by bolt assemblies 48 and 50. This particular nodal isolator includes a torsion bar 20. The spring 44 and weights 46 are optional. That is, they are utilized if it is desired to uncouple the isolated mass at more than one frequency, for example at 3/rev and 6/rev. The isolator of FIG. 12 is a so-called two frequency isolator.

Figure 13:
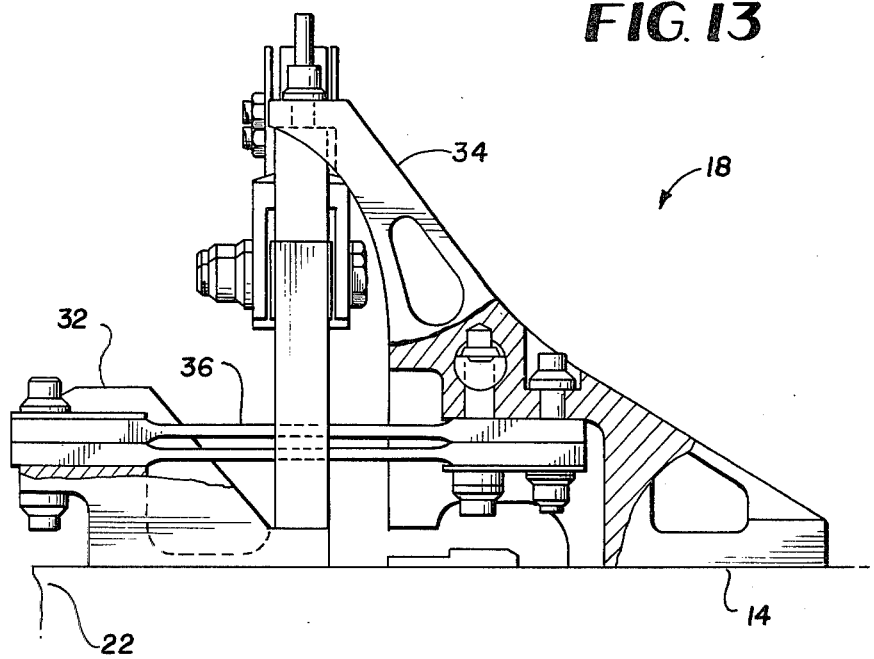

FIGS. 13–15 illustrate various views of a nodal isolator essentially like that of FIG. 12, which is used to uncouple and support the passenger floor area. This nodal isolator can also be used in the cockpit area. The essential parts as illustrated bear the same reference numerals as does the nodal isolator of FIG. 12.

In FIGS. 16 and 17, a fuel tank 28 is shown mounted for isolation to the airframe 14 via an isolator 18.

The isolator 18 comprises a fitting 52 attached to fuselage 14 and a fitting 53 attached to the fuel tank 28. Both fittings are connected by a spring 54 and an inertia bar 55 at two pivot points 56. An inertia weight 57 is attached to the bar 55. This arrangement combines the basic elements required for a nodal isolator and the elements required to provide vertical motion, i.e., a four bar linkage. The flat spring 54 and the portion of the bar 55 between pivots 56 also react all in-plane forces and moments applied to the system.

What is claimed and desired to be secured by Letters Patent of the United States is:

1. A vibration isolation system for effectively decoupling a seat mounting plate from an airframe to which a periodic forcing function is applied, comprising a plurality of nodal isolators connected to both the airframe and the seat mounting plate to both statically support the seat mounting plate relative to the airframe and to decouple the seat mounting plate from the airframe, said nodal isolators functioning according to the following equation:

$$Z_F = Z_A \frac{\left\{K_I - \omega^2 \left[m_I\left(\frac{R}{r} - 1\right)\frac{R}{r} + \frac{I}{r^2}\right]\right\}}{\left\{K_I - \omega^2 \left[m_F + m_I\left(\frac{R}{r} - 1\right)^2 + \frac{I}{r^2}\right]\right\}}$$

2. The vibration isolation system as defined in claim 1, wherein the seat mounting plate supports a single seat, and is supported and decoupled from the airframe by a pair of lateral nodal isolators and a transverse nodal isolator.

3. The vibration isolation system as defined in claim 2, wherein the lateral nodal isolators are connected by a torsion bar.

4. The vibration isolation system as defined in claim 1, wherein the seat mounting plate comprises a floor on which a plurality of seats are mounted, said floor being supported and decoupled from the airframe by an equal number of nodal isolators along each of its longitudinal edges.

5. The vibration isolation system as defined in claim 1, wherein each nodal isolator includes: a pair of anchor pads, one fastened to the seat mounting plate and the other fastened to the airframe; a spring and lever arm connected to the anchor pads and to the seat mounting plate and airframe; and a flex link mounted between the anchor pads, said lever arm including tuning weight at its free end.

6. A vibration isolation system for effectively decoupling an airframe from the influences of the variable fuel quantity in a fuel tank, comprising at least two nodal isolators connected to both the airframe and the fuel tank to both statically support the fuel tank relative to the airframe and to decouple the airframe from the fuel tank, said nodal isolators functioning according to the following equation:

$$\omega = \sqrt{\frac{K_I}{m_I \frac{\left(\frac{R}{r}\right)^2}{1 + \frac{m_I}{m_F}} + \frac{I}{r^2}}}$$

7. The vibration isolation system as defined in claim 6, wherein said nodal isolators comprise:
a weighted lever arm pivotally connected at its end remote from its weighted portion to both the fuel tank and the airframe; and
a spring connected to both the fuel tank and the airframe, wherein the fuel tank, airframe, weighted lever and spring form a four-bar linkage.

8. The vibration isolation system as defined in claim 7, wherein the spring is a flat spring connected at its ends to the fuel tank and airframe.

9. A nodal isolator for decoupling a vibrating mass from the influence of variations in the mass of a body of varying mass, such that the force feedback from the body to the vibrating mass, due to the variations in the mass of the body, is eliminated, said isolator comprising:
a weighted lever arm pivotally connected at its end remote from its weighted portion to both the body of varying mass and the vibrating mass; and
a spring connected to both the body of varying mass and the vibrating mass, such that the connections of the weighted lever arm lie in one plane and the connections of the spring lie in another plane, both planes being substantially parallel, resulting in the body of varying mass, the vibrating mass, the weighted lever arm, between its two connections, and the spring forming a four-bar linkage which produces a reaction to all in-plane forces and moments applied to the isolator.

10. The nodal isolator as defined in claim 9, wherein the spring is a flat spring connected at its ends to the body of varying mass and the vibrating mass.

* * * * *